United States Patent [19]

Akselrud et al.

[11] Patent Number: 5,162,125
[45] Date of Patent: Nov. 10, 1992

[54] HEATED AND COOLED VALVE STEM FOR AN INJECTION MOLDING APPARATUS

[75] Inventors: Vitaly Akselrud, Richmond Hill; Rene Bertschi, Toronto; Gordon T. Mackay, Richmond Hill, all of Canada

[73] Assignee: Husky Injection Molding Systems Ltd., Bolton, Canada

[21] Appl. No.: 707,660

[22] Filed: May 30, 1991

[51] Int. Cl.⁵ ............................................. B29C 45/23
[52] U.S. Cl. ........................... 425/548; 264/328.14; 425/562; 425/564
[58] Field of Search ............... 425/549, 548, 562, 563, 425/564, 565, 566, 217, 547; 264/328.14

[56] References Cited

U.S. PATENT DOCUMENTS

| | | | |
|---|---|---|---|
| 2,508,988 | 5/1950 | Bradley | 165/30 |
| 4,125,352 | 11/1978 | Gellert | 425/549 |
| 4,276,015 | 6/1981 | Rogers | 425/548 |
| 4,406,609 | 9/1983 | Gellert | 425/566 |
| 4,438,064 | 3/1984 | Tsutsumi | 425/549 |
| 4,443,177 | 4/1984 | Modur et al. | 425/549 |
| 4,521,179 | 6/1985 | Gellert | 425/566 |
| 4,687,613 | 8/1987 | Tsutsumi | 425/549 |
| 4,955,804 | 9/1990 | Martell | 425/549 |
| 5,012,839 | 5/1991 | Rogers et al. | 425/563 |
| 5,049,062 | 9/1991 | Gellert | 425/549 |

*Primary Examiner*—Tim Heitbrink
*Attorney, Agent, or Firm*—Bachman & LaPointe

[57] ABSTRACT

A mold cavity, a molten plastic inlet conduit for communication therewith and a channel in the inlet conduit for conveying molten plastic to the mold cavity. Separate heating and cooling are provided in the inlet conduit adjacent the mold cavity to closely control the temperature of the molten plastic in the channel adjacent the mold cavity.

10 Claims, 2 Drawing Sheets

HEATED AND COOLED VALVE STEM FOR AN INJECTION MOLDING APPARATUS

BACKGROUND OF THE INVENTION

The present invention relates to a system for injection molding plastic materials using injection nozzles, especially valve gated nozzles including a hot runner system.

Hot runner mold nozzles have been used in many molding applications. There are several design elements included in valve gated nozzles including the method of operation, the design configuration of the gate when opened, the temperature control of the components adjacent the mold cavity and how leakage of the plastic is controlled.

Temperature control of the plastic adjacent the mold cavity represents a particular problem.

The heating and/or cooling of the nozzle stem is shown in U.S. Pat. Nos. 4,125,352, 4,406,609, 4,521,179 and 4,276,015. However, the methods used either heat or cool. The references do not teach how both heating and cooling can be achieved in the stem at different points in the cycle. The '352 and '609 references both relate to a valve stem containing a heat pipe, which can of course be used for both heating and cooling; however, there is no disclosure in these references either about how this would be done. The reason both heating and cooling is useful is for example heating would be used to quickly bring the stem to operating temperature from room temperature when the system was being started and cooling would be used to maintain the stem at operating temperature during the operating cycle.

Accordingly, it is a principal object of the present invention to provide an injection molding apparatus which enables close control of molten plastic temperature adjacent the mold cavity.

It is a still further object of the present invention to provide an apparatus as aforesaid which enables one to selectively heat or cool the molten plastic adjacent the mold cavity, especially in an injection nozzle or valve stem thereof.

Further objects and advantages of the present invention will appear hereinbelow.

SUMMARY OF THE INVENTION

In accordance with the present invention it has now been found that the foregoing objects and advantages may be readily obtained.

The apparatus of the present invention comprises: a mold cavity; a molten plastic inlet conduit defining an outer end for communication with a source of molten plastic and an inner end for communication with said mold cavity; channel means in said inlet conduit for conveying molten plastic to said mold cavity; heating means in said inlet conduit adjacent the mold cavity in heat exchange relationship to said channel means; cooling means in said inlet conduit adjacent the mold cavity and spaced from and separate from said heating means in heat exchange relationship to the channel means; wherein said heating and cooling means are operative to closely control the temperature of the molten plastic in said channel means adjacent the mold cavity.

The inlet conduit means may include the injection nozzle. Preferably, the apparatus includes a valve stem in the inlet conduit, wherein the heating and cooling means are located in the valve stem. In the preferred embodiment, the channel means has an inner end adjacent the mold cavity and includes an inlet channel to said mold cavity adjacent the inner end of the channel means, wherein the valve stem is mounted in the inlet conduit and is adapted to prevent flow of molten plastic through the inlet channel in a first longitudinal position and to permit flow of molten plastic through said inlet channel in a second longitudinal position. The channel means is preferably in the valve stem and defines an annular channel adjacent the inlet channel, wherein the heating and cooling means are in heat exchange relationship to the channel means and to the annular channel.

The heating and cooling means generally extend longitudinally adjacent the channel means. A drain channel is preferably provided in the inlet conduit to conduct leaking plastic away from the inlet conduit, wherein the heating and cooling means are in heat exchange relationship to the drain channel.

Further features and advantages of the present invention will appear from the following specification.

BRIEF DESCRIPTION OF THE DRAWINGS

The features of the present invention will become more apparent from an examination of the succeeding e specification when read in conjunction with the appended drawings, in which.

DETAILED DESCRIPTION

Figure 1:
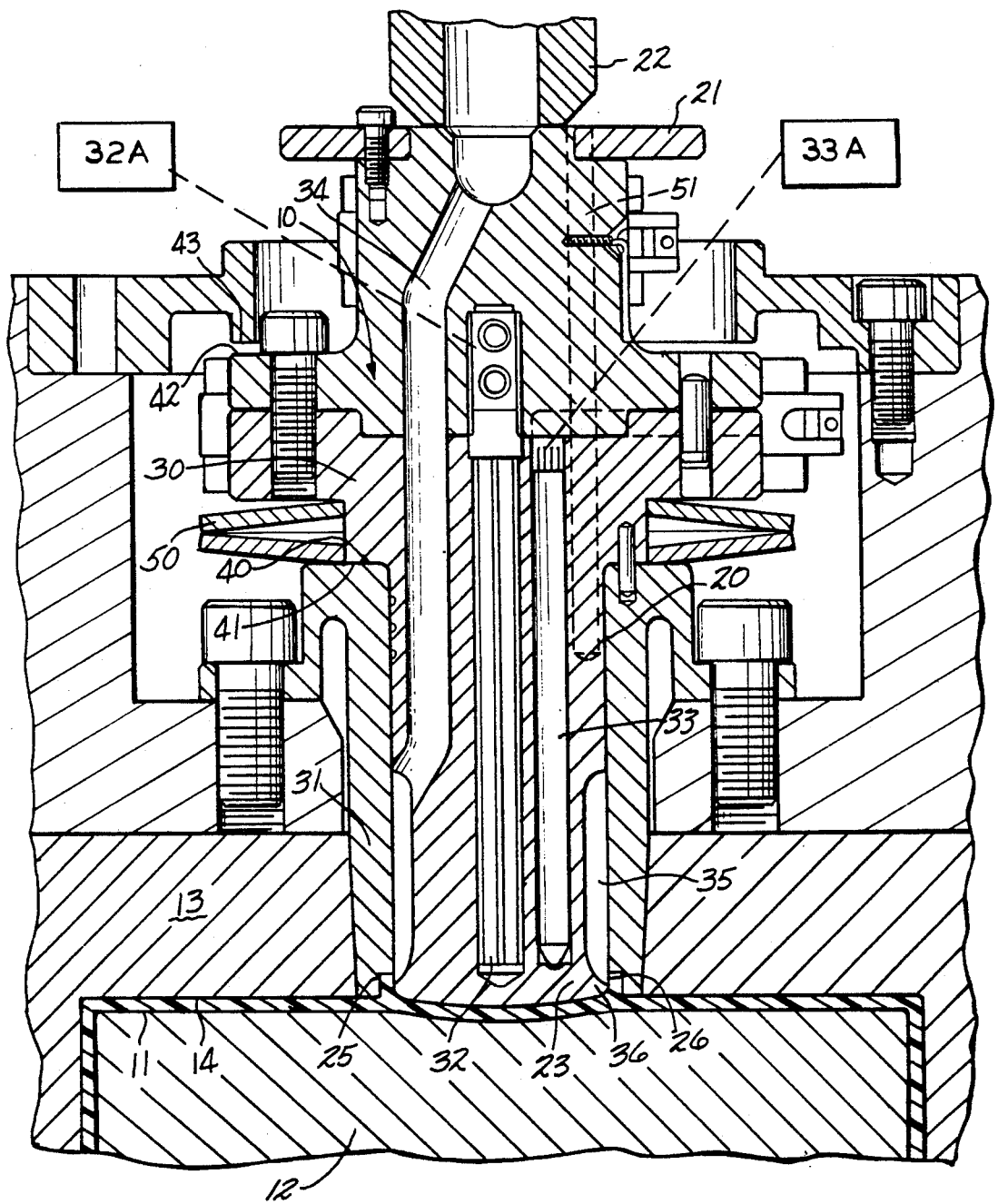
FIG. 1 is a longitudinal sectional view of the apparatus of the present invention showing the inlet channel open to the mold cavity.
Figure 2:
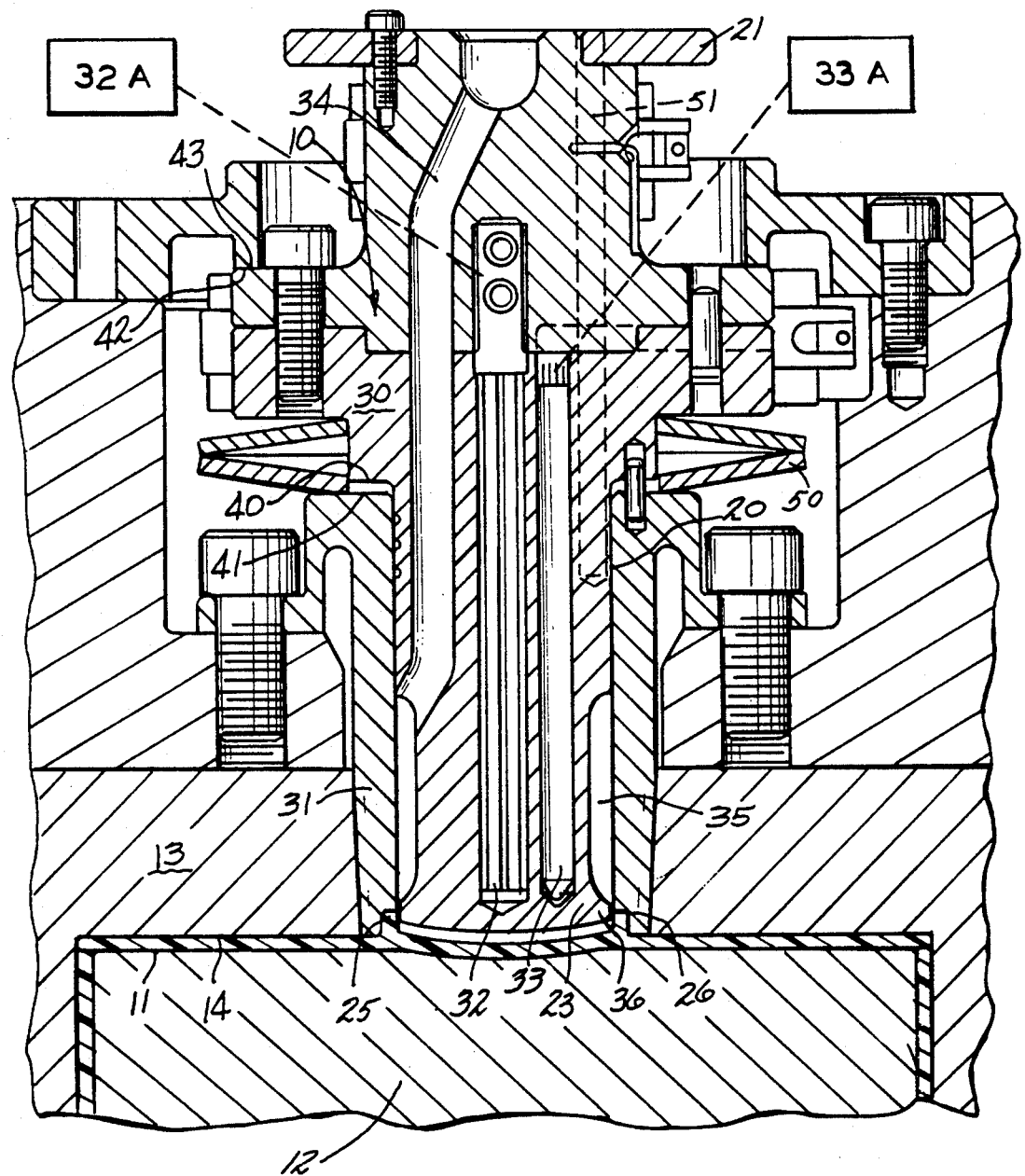
FIG. 2 is a longitudinal sectional view similar to FIG. 1 showing the inlet channel closed to the mold cavity.

Referring to FIGS. 1 and 2, valve gate 10 is shown which may be employed in a conventional multiple cavity injection molding system. For convenience in the the following specification, however, only a single cavity is shown.

Each mold cavity 11 is defined by a mold core 12 and an outer mold half 13 which are conventionally adapted to move together to define the mold cavity 11 and then to move apart to permit removal of the molded article 14 formed in the mold cavity. The present invention is particularly useful in molding large parts, although a variety of size parts may be readily formed in accordance with the present invention.

Valve gate 10 includes molten plastic inlet conduit 20 communicating with mold cavity 11 for transport of molten plastic from a source of molten plastic to the mold cavity. Inlet conduit 20 defines an outer end 21 communicating with a source of molten plastic (not shown) for delivery of molten plastic to the inlet conduit and mold cavity 11. Injection nozzle means 22, which may be a part of the inlet conduit, communicates with the outer end 21. Inlet conduit 20 also includes an inner end 23 communicating with the mold cavity 11. Inlet channel 25 to mold cavity 11 is provided adjacent the inner end 23 of inlet conduit 20.

Valve stem 30 is mounted in inlet conduit 20 and slides inside valve body member 31 from an inlet channel open position as shown in FIG. 1 to an inlet channel 25 closed position as shown in FIG. 2 in a manner to be described hereinbelow. It is preferred, but not required, in accordance with the present invention that the inlet channel 25 be a large diameter of at least one (1) inch in order to accommodate a high resin flow.

Valve stem 30 contains heating means 32 connected to schematically shown heat source 32A and cooling means 33 connected to schematically shown cooling source 33A in order to insure close control of temperature in a manner to be described below.

Valve stem 30 includes channel means 34 for conducting molten plastic from injection nozzle 22 to mold cavity 11. Channel means 34 defines an annular channel 35 adjacent inlet channel 25.

Valve stem 30 includes a first stop means 40 on the valve stem which contacts valve body stop means 41 and a second stop means 42 which contacts locating ring 43 as shown in FIG. 2.

Thus, the valve is opened by the action of injection or machine nozzle 22 pressing against valve stem 30 as shown in FIG. 1 compressing spring means 50 contacting valve stem 30. Any desired spring means may be used as the disk springs shown in the drawings. The opening stroke continues until first stop means 40 contacts valve body stop means 41 as shown in FIG. 1. This creates an opening 26 in inlet channel 25 between enlarged head portion 36 of valve stem 30 and valve body permitting the flow of molten plastic to the mold cavity. The resin then fills mold cavity 11.

FIG. 2 shows the valve gate in the closed position. Nozzle 22 is removed and spring means 50 cause stem 30 to move until second stop means 42 contacts locating ring 43. In this position, valve stem head 36 has closed opening 26 shutting off the flow of resin to the mold cavity.

Thus, the valve stem is movable from a first longitudinal position shown in FIG. 2 to prevent flow of molten plastic to the mold cavity to a second longitudinal position shown in FIG. 1 to permit flow of molten plastic to the mold cavity.

Resin drain channel 51 is provided in the valve stem 30 adjacent the valve body 31 to conduct resin leaking at the stem-body interface away from the stem to the machine purge area (not shown).

Thus, in accordance with the apparatus described hereinabove, heating means 32 are provided in inlet conduit 20 in heat exchange relationship to channel means 34 and cooling means 33 is located in inlet conduit 20 also in heat exchange relationship to channel means 34. However, the heating and cooling means are separate from each other. Thus, in accordance with the apparatus of the present invention, heating may be used to quickly bring the stem to operating temperature from room temperature when the system was at start up and cooling would be used to maintain the stem at operating temperature during the operating cycle. The separate heating and cooling means is highly advantageous adjacent the mold cavity as for example in the valve stem or in the injection nozzle. This feature permits the stem temperature to be closely controlled by both heating and cooling means separate from each other and therefore permitting rapid control of temperature within close operating ranges at start up and during operation.

As can be seen from the drawings, the heating and cooling means extend longitudinally adjacent the channel means to provide good heat exchange relationship therebetween. Also, the heating and cooling means are in heat exchange relationship to the drain channel to provide good temperature control thereover.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Injection molding apparatus comprising:
   a mold cavity;
   a molten plastic inlet conduit defining a first end for communication with a source of molten plastic and a second end for communication with said mold cavity, said inlet conduit including channel means for conveying molten plastic to said mold cavity;
   an inlet channel to said mold cavity between the channel means and the mold cavity;
   heating means in said inlet conduit in heat exchange relationship to said channel means;
   cooling means in said inlet conduit separate from said heating means and adjacent said mold cavity in heat exchange relationship to said channel means;
   a valve stem mounted in said inlet conduit operative to prevent flow of molten plastic through said inlet channel in a first longitudinal position and to permit flow of molten plastic through said inlet channel in a second longitudinal position,
   wherein said heating and cooling means are operative to closely control the temperature of the molten plastic in said channel means adjacent the mold cavity at start-up and during operation, with the heating means operative to obtain operating temperature from start-up and the cooling means operative to maintain operating temperature during operation and wherein said heating and cooling means are located in said valve stem.

2. Apparatus according to claim 1 wherein said inlet conduit includes an injection nozzle.

3. Apparatus according to claim 1 wherein said channel means has a leading end adjacent the mold cavity and includes said inlet channel to said mold cavity adjacent the leading end of said channel means, wherein said valve stem is mounted in said inlet conduit and is adapted to prevent flow of molten plastic through said inlet channel in a first longitudinal position and to permit flow of molten plastic through aid inlet channel in a second longitudinal position.

4. Apparatus according to claim 3 wherein said channel means is in said valve stem and defines an annular channel adjacent said inlet channel and wherein said heating and cooling means are in hat exchange relationship to said channel means and to the annular channel.

5. Apparatus according to claim 1 wherein said heating and cooling means extend longitudinally adjacent said channel means.

6. Apparatus according to claim 1 including a drain channel in said inlet conduit to conduct leaking plastic away form the inlet conduit, wherein said heating and cooling means are in heat exchange relationship to said drain channel.

7. Apparatus according to claim 1 including a valve body member adjacent said valve stem, wherein said valve stem slides inside the valve body member.

8. Apparatus according to claim 7 wherein the valve stem and valve body member include adjacent stop means, with a spring means therebetween, wherein the valve stem is operative to open and close the inlet channel by compressing the spring means between the valve stem and valve body member stop means.

9. Apparatus according to claim 8 including a locating ring adjacent the valve stem, and a second valve stem stop means adjacent the locating ring, wherein the second valve stem stop means contacts the locating ring in the inlet channel closed position to restrict the movement of the valve stem.

10. Apparatus according to claim 1 wherein said valve stem includes an enlarged head portion operative to open and close said inlet channel upon movement of the valve stem from first to second longitudinal position thereof.

* * * * *

UNITED STATES PATENT AND TRADEMARK OFFICE
CERTIFICATE OF CORRECTION

PATENT NO. : 5,162,125

DATED : November 10, 1992

INVENTOR(S) : Vitaly Akselrud et al.

It is certified that error appears in the above-identified patent and that said Letters Patent is hereby corrected as shown below:

In Column 4, claim 3, line 43, change "aid" to read --said--.

In Column 4, claim 4, line 48, change "hat" to read --heat--.

Signed and Sealed this

Fifth Day of October, 1993

Attest:

BRUCE LEHMAN

*Attesting Officer*    *Commissioner of Patents and Trademarks*